US012580492B2

(12) United States Patent     (10) Patent No.: US 12,580,492 B2

Kneissl et al.     (45) Date of Patent: Mar. 17, 2026

(54) POWER CONVERTER WITH COLOR-ANODIZED ALUMINUM BUSBARS, AND METHOD FOR PRODUCING SUCH A POWER CONVERTER

(71) Applicant: Siemens Aktiengesellschaft, Munich (DE)

(72) Inventors: Philipp Kneissl, Nuremberg (DE); Stephan Neugebauer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 18/015,245

(22) PCT Filed: May 10, 2021

(86) PCT No.: PCT/EP2021/062335

§ 371 (c)(1),
(2) Date: Jan. 9, 2023

(87) PCT Pub. No.: WO2022/008122

PCT Pub. Date: Jan. 13, 2022

(65) Prior Publication Data

US 2023/0261584 A1     Aug. 17, 2023

(30) Foreign Application Priority Data

Jul. 10, 2020    (EP) .................................... 20185313

(51) Int. Cl.
*H02M 7/00*     (2006.01)
*C25D 11/02*     (2006.01)

(52) U.S. Cl.
CPC ........... *H02M 7/003* (2013.01); *C25D 11/022* (2013.01)

(58) Field of Classification Search
CPC ........ H02M 7/00; H02M 7/003; C25D 11/022
USPC ......................................................... 174/68.2
See application file for complete search history.

(56) References Cited

U.S. PATENT DOCUMENTS

| | | | |
|---|---|---|---|
| 2010/0092797 A1* | 4/2010 | Darcy | C25D 11/22 |
| | | | 428/650 |
| 2010/0155251 A1 | 6/2010 | Bogue et al. | |
| 2015/0132602 A1 | 5/2015 | Sun et al. | |
| 2016/0305036 A1 | 10/2016 | Silberbauer et al. | |
| 2018/0190837 A1* | 7/2018 | Reich | H01L 31/1876 |

(Continued)

FOREIGN PATENT DOCUMENTS

| | | |
|---|---|---|
| CN | 105900181 A | 8/2016 |
| CN | 109989068 A | 7/2019 |

(Continued)

OTHER PUBLICATIONS

*PCT International Preliminary Report on Patentability malled Apr. 10, 2022 corresponding to PCT International Application No. PCT/EP2021/062335 filed Oct. 5, 2021.*

(Continued)

*Primary Examiner* — Tremesha W Burns

(74) *Attorney, Agent, or Firm* — Henry M. Feiereisen LLC

(57) ABSTRACT

In a method for producing a power converter, a surface or at least part of the surface of at least two aluminum busbars is subjected to an anodizing treatment to color the surface with at least one specifiable color, and a cold gas coating is applied on a first part of the surface to produce a contact surface.

8 Claims, 2 Drawing Sheets

(56)           References Cited

U.S. PATENT DOCUMENTS

| | | | |
|---|---|---|---|
| 2020/0187385 A1* | 6/2020 | Olesen | H01L 23/473 |
| 2020/0243703 A1* | 7/2020 | Van Duijnhoven | B32B 27/36 |
| 2024/0248565 A1* | 7/2024 | Bergstrom | G06F 3/0428 |

FOREIGN PATENT DOCUMENTS

| | | |
|---|---|---|
| CN | 111108819 A | 5/2020 |
| EP | 2204473 A2 | 7/2010 |
| WO | WO 2015084331 A1 | 6/2015 |

OTHER PUBLICATIONS

Feng Liping et al: "Northwest Industrial University Press", Film Techniques and Applications, 01th Edition, p. 196, Feb. 29, 2016.

* cited by examiner

POWER CONVERTER WITH COLOR-ANODIZED ALUMINUM BUSBARS, AND METHOD FOR PRODUCING SUCH A POWER CONVERTER

CROSS-REFERENCES TO RELATED APPLICATIONS

This application is the U.S. National Stage of International Application No. PCT/EP2021/062335, filed May 10, 2021, which designated the United States and has been published as International Publication No. WO 2022/008122 A1 and which claims the priority of European Patent Application, Ser. No. 20185313.2, filed Jul. 10, 2020, pursuant to 35 U.S.C. 119(a)-(d).

BACKGROUND OF THE INVENTION

The invention relates to a method for producing a power converter with at least two aluminum busbars. The invention further relates to an aluminum busbar for such a power converter. The invention also relates to such a power converter with at least two such aluminum busbars.

In power converters, current must be transmitted between the individual components at many points. Above a certain current intensity, printed circuit boards and cables are no longer suitable for this task and busbars, often also referred to as discrete busbars, are used. Galvanically nickel-plated copper rails are often used, in particular for protection from sulfur compounds, to transmit current. These have a high conductance and are tried and tested.

Alternatively, aluminum busbars are also used, which are more favorable than the copper rails. However, these require a surface coating in order to suppress a build-up of aluminum oxide at the contact point and thus to realize a reproducibly low transition resistance at contact points. This galvanic coating is more expensive than in the case of copper rails. The coloring of the treated aluminum rails corresponds to the coating material and is usually silver.

Recently, cold-spray coatings, also referred to as cold gas coatings, have also been known for reducing the transition resistance at the contact point. These enable local treatment of the material and usually do not require a multilayer structure as in the case of galvanic solutions. The rails, which were hitherto used for current-carrying purposes, could hitherto only be used with a galvanically nickel-plated surface at high current densities. Alternatively, the surface was often only cleaned and greased. Some spray methods, but in particular the cold-spray method, penetrate the oxide layer of aluminum and therefore enable the use of otherwise untreated aluminum at high current densities or with limited cooling.

The object of the invention is to improve a production method for a power converter and a power converter with aluminum busbars.

SUMMARY OF THE INVENTION

This object is achieved by a method for producing an aluminum busbar for a power converter, wherein, in a first step, the surface or at least parts of the surface of the aluminum busbar are provided with one or more specifiable colors by means of an anodizing treatment, and in a second step, a cold gas coating is used at least on a first part of the surface in order to create a contact surface. Furthermore, the object is achieved by an aluminum busbar for a power converter which has been produced by means of such a method for production, the surface of the aluminum busbar having a specified color which has been applied to the surface by means of the anodizing treatment. The object is further achieved by a power converter having at least one such aluminum busbar, the color of at least two of the busbars of the power converter differing. The object is also achieved by a method as set forth hereinafter and by a power converter as set forth hereinafter.

Further advantageous embodiments of the invention are specified in the dependent claims.

The invention is based, inter alia, on the finding that a particularly advantageous aluminum busbar for power converters can be produced by the combination of anodization and subsequent cold gas coating. It has been shown that a cold gas coating can be carried out not only with an untreated aluminum busbar, but also an anodized aluminum busbar can be processed by means of the cold gas coating.

Anodization is associated with a build-up of the aluminum-oxide layer, which is poorly electrically conductive. Anodization is therefore normally unsuitable for busbars. Only with the cold gas coating, which can also be used with an anodized aluminum rail, can the anodized aluminum rails also be used as busbars. The cold gas coating breaks through the anodized layer at the contact points and thus creates good contact resistance on the otherwise poorly conductive rail surface. The surface therefore need not be treated completely with the cold gas coating. It is sufficient to process or treat only the contact points accordingly.

The anodized surface of the aluminum busbar not only provides better protection from corrosion than a naturally formed oxide layer, but it can also be used for optical purposes and be colored as desired. In other words, the aluminum busbar can be given a specifiable color by means of an anodizing treatment before the cold-spray treatment.

Colored busbars provide a multiplicity of advantages. In this case, different rails can be coded in color and thus interchanging or incorrect assembly can be reliably prevented. The function of the individual rails can also be better visualized by highlighting in color (for example, differentiation of DC and AC rails or polarity in the cabinet). Anodizing is more favorable than a galvanic coating of aluminum and nonetheless offers many advantages of an optical and corrosion-protecting surface which give the customer a correspondingly valuable impression. In contrast to painting or shrinkage, the colored surface cannot flake off.

A special feature is the coloring of the busbars with a color which differs noticeably from the natural aluminum color and serves a special purpose (functional color, for example coding of the polarity). A further special feature is the breaking open of the paint layer at the contact points by the spraying method by means of cold gas coating.

A power converter can also have busbars both as aluminum busbars and made of copper. Due to the coloring of the aluminum busbar, it differs from the copper busbar. Alternatively, it is also possible to match the color of the aluminum busbar to the color of the copper busbar. In particular, this is advantageous when the aluminum busbar and the copper busbar have the same function and/or the same hazard potential.

In an advantageous embodiment of the invention, a color for the aluminum busbar is assigned to the aluminum busbar of the power converter as a function of the function and/or the hazard potential. In other words, in an advantageous embodiment of the invention, a color for the respective aluminum busbar of the power converter is specified as a function of the function and/or the hazard potential. During the assembly of the power converter, the different busbars can thus be distinguished in a simple manner if busbars with different functions differ in color. In other words, the busbars each have a different color depending on the function. As a result, the assembly time can be reduced because the assembly instructions can be kept significantly simpler and more comprehensible. Due to the different color, a simple assignment of the individual busbars to their function due to the color is also possible in the case of maintenance or repair. This also reduces the time for maintenance and repair.

In addition, it is it is alternatively or additionally possible to characterize different hazard potentials by means of the color of the busbars. Thus, for example, busbars to which a low and thus non-hazardous voltage, also referred to as protective low voltage, is applied, can be characterized by a specific color, for example green. Low voltage up to 1000V can be characterized by another color. A specific color can also be provided for voltages above 1000V, often referred to as medium voltage or high voltage, as they pose a higher risk for maintenance personnel.

In addition, it is also possible to characterize the function of a busbar by means of the color. Thus, a specific color is provided for busbars for the transmission of direct current and/or which are supplied with direct voltage. For busbars with alternating voltage or for alternating current, the aluminum busbar can have a different color.

Alternatively or additionally, it is possible for the aluminum busbar to have different colors in order to signal both the function and the hazard potential.

BRIEF DESCRIPTION OF THE DRAWING

The invention is described and explained in more detail hereinafter with reference to the exemplary embodiments shown in the figures, in which.

DETAILED DESCRIPTION OF PREFERRED EMBODIMENTS

Figure 1:
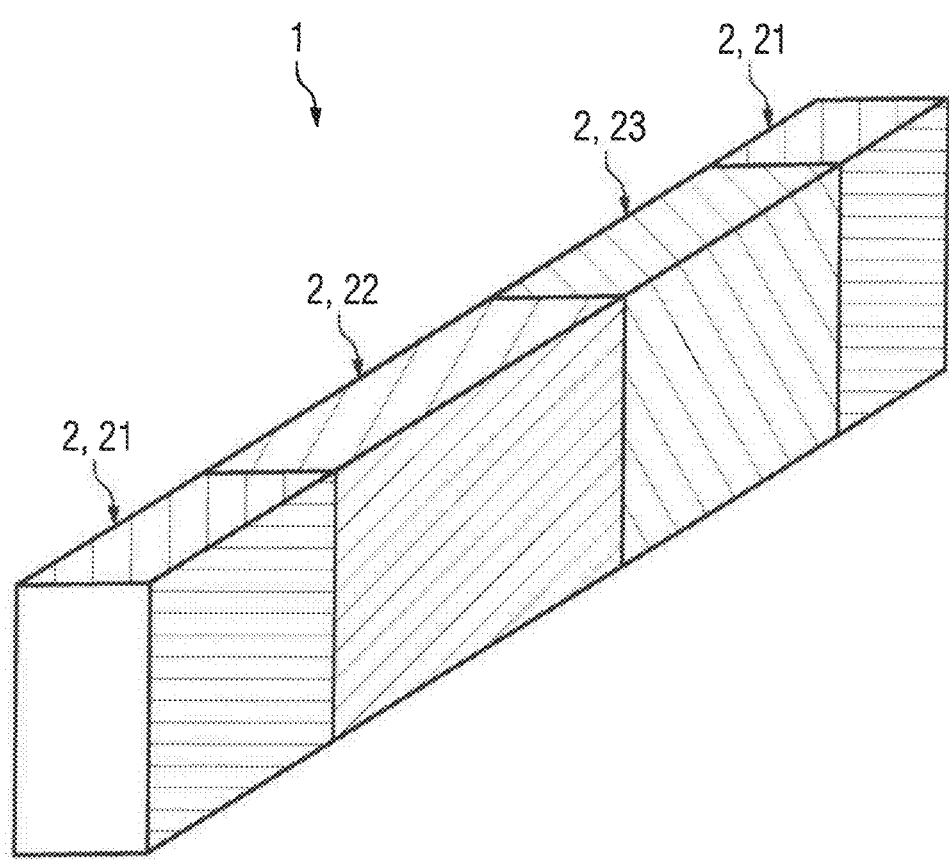
FIG. 1 shows a color-anodized aluminum busbar with a cold gas coating.

FIG. 1 shows an aluminum busbar 1. The surface 2 of the aluminum busbar 1 was subjected to an anodizing treatment in the course of the production process. A cold gas coating was subsequently carried out on a first part 21 of the surface 2. This first surface constitutes the contact surface on which electrical contact with another component can take place. Often, the first part 21 with the cold gas coating is located at the end of the busbar as this is usually provided for electrical contacting. A second part 22 of the surface 2 has a specified color. This color can characterize the function of the aluminum busbar, for example use as a busbar for direct voltage or direct current, or alternating voltage or alternating current. The second part 22 of the surface 2, which has a specified color, can be located circumferentially around the aluminum busbar 1, as shown. Alternatively, it is also possible for only one flat or planar part, for example a lateral surface, of the aluminum power plane to have a color. For example, a flat rectangular part of a lateral surface of the aluminum busbar 1 can have a specified color.

In addition, this busbar has a further color on a third part 23 of its surface 2. This can be used, for example, for characterizing the hazard potential, for example the voltage level, such as protective low voltage, low voltage or high voltage. The different areas of the surface 2 are characterized by different hatching in FIG. 1. The hatching is circumferential, but advantageously only a usually flat surface would be coated.

As an alternative to the exemplary embodiment shown here, it is also possible to use only one color characterization for the aluminum busbar 1. In this case, the third part 23 of the surface can be colorless or the surface can consist only of a first part 21 and a second part 22.

Figure 2:
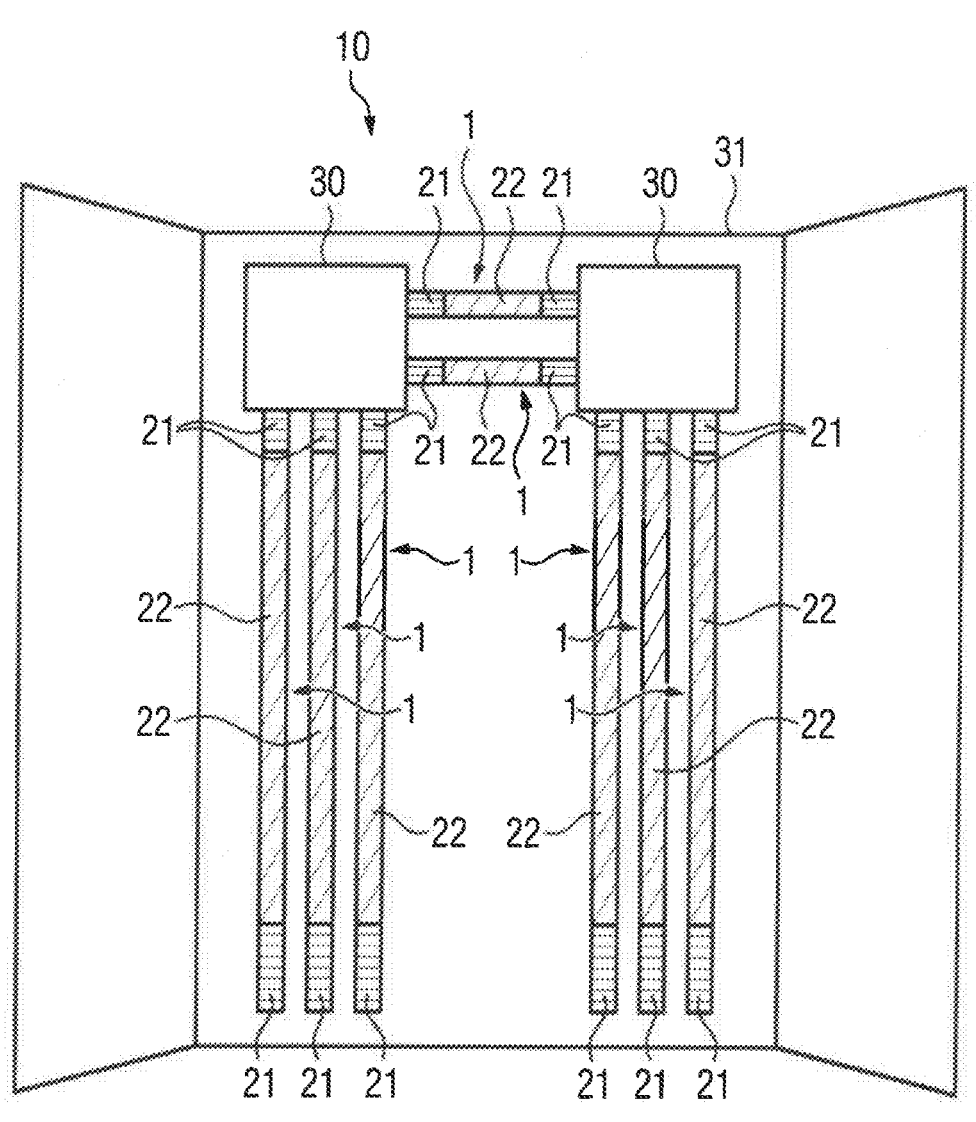
FIG. 2 shows a power converter with such an aluminum busbar.

FIG. 2 shows a power converter 10 having a plurality of aluminum busbars 1 which are arranged in a power converter cabinet 31 of the power converter 10. The aluminum busbars 1 are used, inter alia, to electrically connect electrical components 30 such as, for example, semiconductors, capacitors, coils, fuses or connections to one another. In this case, for example, the aluminum busbars 1, which are arranged between the electrical components 30, can be busbars for the transmission of direct current, in which a direct voltage is present between these two busbars. These are therefore characterized by a defined color. The groups of, in each case, three aluminum busbars 1 extending perpendicularly in the power converter 10 can be used for the transmission of alternating current with an alternating voltage. Due to the different function, these have a different color compared to the defined color of the direct current busbar. This is characterized by different hatching in FIG. 2. In this exemplary embodiment, the surface 2 of the aluminum busbars 1 has, in each case, only a first and a second part 21,22 and thus only one color. In addition, it is also possible, by inserting a third part 23 of the surface 2, to signal a further property such as, for example, the hazard potential of the busbar by means of further colors. For the sake of clarity, however, it has been omitted in the illustration in FIG. 2.

In conclusion, the invention relates to a method for producing an aluminum busbar for a power converter or a power converter with at least two aluminum busbars. To improve the assembly and maintenance of a power converter with such an aluminum busbar, it is proposed that in a first step, the surface or at least parts of the surface of the aluminum busbar are provided with a specifiable color by means of an anodizing treatment, in a second step a cold gas coating then being used at least on a first part of the surface to produce a contact surface. Furthermore, the invention relates to an aluminum busbar for a power converter produced by such a method, the surface of the aluminum busbar having a specified color which has been applied to the surface by means of the anodizing treatment. The invention further relates to a power converter with such aluminum busbars, the color of at least two of the aluminum busbars of the power converter differing.

The invention claimed is:

1. A method for producing a power converter, said method comprising:
   subjecting a surface or at least part of the surface of at least two aluminum busbars to an anodizing treatment to color the surface with at least one specifiable color; and
   applying a cold gas coating on a first part of the surface to produce a contact surface.

2. The method of claim 1, wherein the color is specified depending on a function and/or a hazard potential of the at least two aluminum busbars.

3. The method of claim 1, further comprising signaling by the color a function and/or a hazard potential of the at least two aluminum busbars.

4. The method of claim 1, further comprising:

applying an anodized coating on a second part of the surface through the anodizing treatment to designate with the color a function of the respective one of the at least two aluminum busbars; and signaling by the color an intended use of the respective one of the at least two aluminum busbars for direct voltage or direct current or alternating voltage or alternating current.

5. A power converter, comprising:

at least two aluminum busbars, each of the at least two aluminum busbars having a surface including a first part and a second part, with a cold gas coating on the first part of the surface creating a contact surface, and with an anodized coating on the second part of the surface, with each anodized coating colored with a specified color, wherein the color of one of the at least two aluminum busbars is different than the color of another one of the at least two aluminum busbars, and the color of the one of the at least two aluminum busbars and the color of the another one of the at least two aluminum busbars are selected depending on a function and/or a hazard potential of the at least two aluminum busbars; and electrical components electrically connected to at least one of the at least two aluminum busbars.

6. The power converter of claim 5, wherein the color of the one of the at least two aluminum busbars and the color of the other one of the at least two aluminum busbars are designed to signal both the function and the hazard potential.

7. The power converter of claim 5, wherein, when a protective low voltage is applied to one of the at least two aluminum busbars, the color is a first color, when a low voltage up to 1000 V is applied to one of the at least two aluminum busbars, the color is a second color, and when a medium voltage or high voltage is applied to one of the at least two aluminum busbars, the color is a third color.

8. The power converter of claim 5, wherein the color designates an intended use of the respective one of the at least two aluminum busbars for direct voltage or direct current or alternating voltage or alternating current.

\* \* \* \* \*